(12) United States Patent
Shokrollahi et al.

(10) Patent No.: US 8,817,123 B2
(45) Date of Patent: Aug. 26, 2014

(54) METHOD FOR AUTHENTICATING A CHARGE-COUPLED DEVICE (CCD)

(75) Inventors: Jamshid Shokrollahi, Ludwigsburg (DE); Christopher Martin, Stuttgart-Zuffenhausen (DE)

(73) Assignee: Robert Bosch GmbH, Stuttgart (DE)

( * ) Notice: Subject to any disclaimer, the term of this patent is extended or adjusted under 35 U.S.C. 154(b) by 320 days.

(21) Appl. No.: 13/199,799

(22) Filed: Sep. 9, 2011

(65) Prior Publication Data
US 2012/0075481 A1     Mar. 29, 2012

(30) Foreign Application Priority Data
Sep. 27, 2010    (DE) .................. 10 2010 041 447

(51) Int. Cl.
*H04N 5/228*     (2006.01)
*H04N 5/335*     (2011.01)
*H04N 17/00*     (2006.01)
*H04N 5/217*     (2011.01)

(52) U.S. Cl.
USPC ......... 348/222.1; 348/311; 348/187; 348/241

(58) Field of Classification Search
USPC ......................................... 348/187, 188, 241
See application file for complete search history.

(56) References Cited

U.S. PATENT DOCUMENTS

| | | | | |
|---|---|---|---|---|
| 4,302,673 A | | 11/1981 | Bly | |
| 7,129,973 B2 * | | 10/2006 | Raynor | 348/231.3 |
| 7,484,885 B1 | | 2/2009 | Carlson et al. | |
| 7,602,935 B2 * | | 10/2009 | Nishino | 382/100 |
| 7,616,237 B2 * | | 11/2009 | Fridrich et al. | 348/241 |
| 7,787,030 B2 * | | 8/2010 | Fridrich et al. | 348/241 |
| 8,160,293 B1 * | | 4/2012 | Fridrich et al. | 382/100 |
| 2002/0191091 A1 * | | 12/2002 | Raynor | 348/241 |
| 2006/0013486 A1 * | | 1/2006 | Burns et al. | 382/195 |
| 2008/0106605 A1 * | | 5/2008 | Schrijen et al. | 348/207.99 |
| 2009/0141931 A1 * | | 6/2009 | Yadid-Pecht et al. | 382/100 |
| 2009/0154809 A1 * | | 6/2009 | Fridrich et al. | 382/181 |
| 2009/0257671 A1 | | 10/2009 | Fridrich et al. | |
| 2010/0194895 A1 * | | 8/2010 | Steinberg et al. | 348/187 |
| 2012/0030270 A1 * | | 2/2012 | Shokrollahi et al. | 708/802 |
| 2012/0087589 A1 * | | 4/2012 | Chang-Tsun et al. | 382/190 |
| 2012/0300988 A1 * | | 11/2012 | Ivanov et al. | 382/115 |
| 2012/0300992 A1 * | | 11/2012 | Ivanov et al. | 382/124 |

FOREIGN PATENT DOCUMENTS

DE     103 40 515     4/2005

OTHER PUBLICATIONS

Ivanov et al.; "Authentication of Fingerprint Scanners"; 2011; IEEE; pp. 1912-1915.*
Kurosawa et al.; "CCD Fingerprint Method—Identification of a Video Camera from Videotaped Images"; 1999, IEEE; pp. 537-540.*
Bartlow et al.; "Identifying Sensor from Fingerprint Images"; 2009, IEEE; pp. 78-84.*
Sutcu et al.; "Improvements on Sensor Noise Based Source Camera Identification"; 2007, IEEE; pp. 24-27.*

(Continued)

*Primary Examiner* — John Villecco
(74) *Attorney, Agent, or Firm* — Kenyon & Kenyon LLP

(57) ABSTRACT

In a method for authenticating a charge-coupled device (CCD), e.g., in a digital camera including the charge-coupled device, a physical unclonable function is utilized for the authentication. In the method, a response to be measured of pixels in the charge-coupled device to a defined incident light is used as the physical unclonable function.

7 Claims, 2 Drawing Sheets

(56) References Cited

OTHER PUBLICATIONS

Hu et al.; "Using Improved Imaging Sensor Pattern Noise for Source Camera Identification"; 2010; IEEE; pp. 1481-1486.*

Filler et al.; "Using Sensor Pattern Noise for Camera Model Identification"; 2008; IEEE; pp. 1296-1299.*

Ravikanth, Pappu Srinivasa: "Physical One-Way Functions," Mar. 2001, Massachusetts Institute of Technology.

Mendoza, Donald Robert: "An Analysis of CCD Camera Noise and its Effect on Pressure Sensitive Paint Instrumentation System Signal-To-Noise Ratio," pp. 22-29, 1997.

Dodis, Yevgeniy et al.: "Robust Fuzzy Extractors and Authenticated Key Agreement from Close Secrets," Jul. 22, 2010, pp. 1-28.

Lukas, Jan et al., "Digital camera Identification from sensor pattern noise," IEEE Transactions on Information Forensics and Security, vol. 1, No. 2, Jun. 2006, pp. 205-214.

Rosenfeld, Kurt at al. "Sensor physical unclonable functions." IEEE International Symposium on Hardware-Oriented Security and Trust (HOST), Jun. 2010, Anaheim, CA, pp. 112-117.

Photonic Optics, LED Ringlight 66180 with Segment Control, Vienna, Jan. 2007.

* cited by examiner

METHOD FOR AUTHENTICATING A CHARGE-COUPLED DEVICE (CCD)

BACKGROUND OF THE INVENTION

1. Field of the Invention

The present invention relates to a method for authenticating a charge-coupled device (CCD), in particular in a digital camera, a device for authenticating a charge-coupled device (CCD), and a corresponding digital CCD camera.

2. Description of the Related Art

Different methods for identifying products as described, for example, in the document "Physical One-Way Functions" by Pappu Srinivasa Ravikanth are already known. In this document the author describes the possibility of basing a cryptography structure on algorithmic one-way functions. These so-called one-way functions are numeric functions and may be viewed in a broader sense as the physical implementation of the encoding method.

Most known methods for identifying and authenticating products are based on the addition of an unclonable module to the product to be identified and authenticated. The product is identified and authenticated by reading out a value specified by the unclonable module. The general approach of using so-called physical unclonable functions to prevent cloning is to generate a module having a specific and unclonable random value or to find a randomly distributed intrinsic property of the module which is to be authenticated.

Three main disadvantages of the addition of a new module are that there are extra costs for the new module, the module must be selected in such a way that allows for the working conditions of the product or device to be identified, and if the product or device to be identified is to be identified during an operating time of the product or device, e.g., every time the corresponding system is started, the content of the module remains readable during or immediately before start-up of the product or device to be identified. This reading requires additional hardware that may be expensive and must be implemented for every product or device to be identified. Such requirements must be fulfilled, for example, when identifying and authenticating a digital CCD camera or the CCD chip implemented therein.

Accordingly, it would be desirable to provide an alternative option for identifying and authenticating a product or device, particularly a digital CCD camera, smoothly, preferably at any time, and as cost-effectively as possible.

BRIEF SUMMARY OF THE INVENTION

The present invention provides a method and a device for authenticating a charge-coupled device (CCD), e.g., in a digital camera including the charge-coupled device, and a corresponding digital CCD camera.

The present invention relates to a method for authenticating a charge-coupled device (CCD), in particular in a digital camera including the charge-coupled device. The method according to the present invention is particularly cost-effective and unclonable.

A so-called charge-coupled device (CCD) is an integrated electronic component for transporting electrical charges. This is a light-sensitive electronic component based on an internal photoeffect. CCD chips were originally developed for data storage but it was quickly established that these components are light-sensitive and it is relatively simple to use them to acquire a two-dimensional image. Two-dimensional CCD array sensors are used in the meantime in video cameras and digital cameras, so-called CCD cameras, but are also used in other units such as spectrometers. The main parameters of a CCD chip are the particular pixel size and the number of pixels on the chip (doping).

The use of a physical unclonable function is provided to identify such a CCD camera (or such a unit) or the CCD chip included therein. A response to be measured of pixels in the charge-coupled device (CCD chip) to a defined incident light is used as a physical unclonable function (PUF) in this context.

The charge-coupled device (CCD-chip) is preferably illuminated with light of a defined wavelength. At least one light emitting diode (LED) may be used as the light source. It is advantageous to use multiple LEDs and to situate them for example in the shape of a ring running around the particular optical axis of the digital CCD camera so that the entire surface of the charge-coupled device (CCD chip) is illuminated.

Moreover, a movable, opaque cover may be provided and used to prevent undesirable incident light on the charge-coupled device during authentication since the light incident from another light source than the light source used for authentication would change the effect or response of the pixels to the light so that authentication is no longer possible.

It is conceivable for the light incident on the charge-coupled device to be provided by a light source integrated into the camera. Moreover, the opaque cover to be provided may be integrated into the camera in a suitable manner in combination with the integrated light source. This is referred to as a so-called in-circuit mode so that so-called in-circuit tests within the camera are possible without adding additional components.

As a result of the method of the present invention, it is possible to directly identify whether for example a video signal is really received by a corresponding camera or was simulated by a falsified signal source. Moreover, with the help of such an in-circuit mode according to the present invention, cryptographic keys may be generated and then used to encode parts of the corresponding camera software so that the software is linked to certain hardware and is not executable by simply copying the corresponding software to another unit or another camera. The new keys may be generated with the help of a fuzzy extractor, for example. Such a method is described for example in "Robust Fuzzy Extractors and Authenticated Key Agreement from Close Secrets" by Yevgeniy Dodis, Jonathan Katz, and Leonie Reyzin. This results in corresponding copy protection for the software stored in the digital camera. Another application is for example the use of the authentication information of the corresponding CCD chip for verifying whether the corresponding camera or the CCD chip is manufactured by a specific hardware manufacturer.

Although several of the above-mentioned applications may be achieved by inserting a smartcard in a particular camera, the method of the present invention, however, offers a new attractive and cost-effective alternative.

As already mentioned, the method of the present invention is based on object authentication using physical unclonable functions. According to the present invention, special and unique properties of the individual CCD chips, namely their particular dimensions and dopings of pixels, are used as unique identification measurement parameters. The so-called scene noise of a CCD chip is used as a physical unclonable function. During authentication, the corresponding response of the physical unclonable function is stimulated and measured. These responses may then be used to identify the corresponding camera or the CCD chip in the camera and to generate cryptographic keys. These unique properties that are assignable to a CCD chip and are referred to in the following as functions, namely unclonable functions, must thus be activated and the individual responses of the CCD chips measured.

To measure the response, e.g., the scene noise of a CCD chip within a digital camera, methods already known from the literature and presented, for example, in the document "An Analysis of CCD Camera Noise and its Effect on Pressure Sensitive Paint Instrumentation System Signal-to-Noise Ratio" by Robert Mendoza may be used. This means that the CCD chip to be authenticated within a digital CCD camera is illuminated by a uniform light and the signal emitted by each pixel is read out using a suitable measurement method. According to the present invention, these read-out signals are interpreted as unique values that are assignable to the particular CCD chip and may thus be used for authenticating the CCD chip or digital camera into which the CCD chip is integrated.

Two measurement scenarios are conceivable, namely the so-called in-circuit setting and the so-called off-circuit setting described in greater detail in the following in connection with the drawing.

Moreover, the present invention provides a device for authenticating a charge-coupled device (CCD) in a digital camera including the charge-coupled device (CCD), the device having a light source for defined illumination of the charge-coupled device with light and a movable opaque cover with the aid of which undesirable light incidence on the charge-coupled device may be prevented during authentication, the device must be situated on the camera during authentication in such a way that the light source illuminates the charge-coupled device in a defined manner and a response of pixels present in the charge-coupled device to the defined light incidence may be measured and evaluated as a physical unclonable function with the aid of an appropriate measuring and evaluation unit.

It is conceivable for the measuring and evaluation unit to be an integral component of the device.

Moreover, it is also conceivable for the device to be an integral component of the corresponding digital camera including the charge-coupled device.

Moreover, the present invention provides a digital CCD camera having a corresponding device as described above.

DETAILED DESCRIPTION OF THE INVENTION

Figure 1:
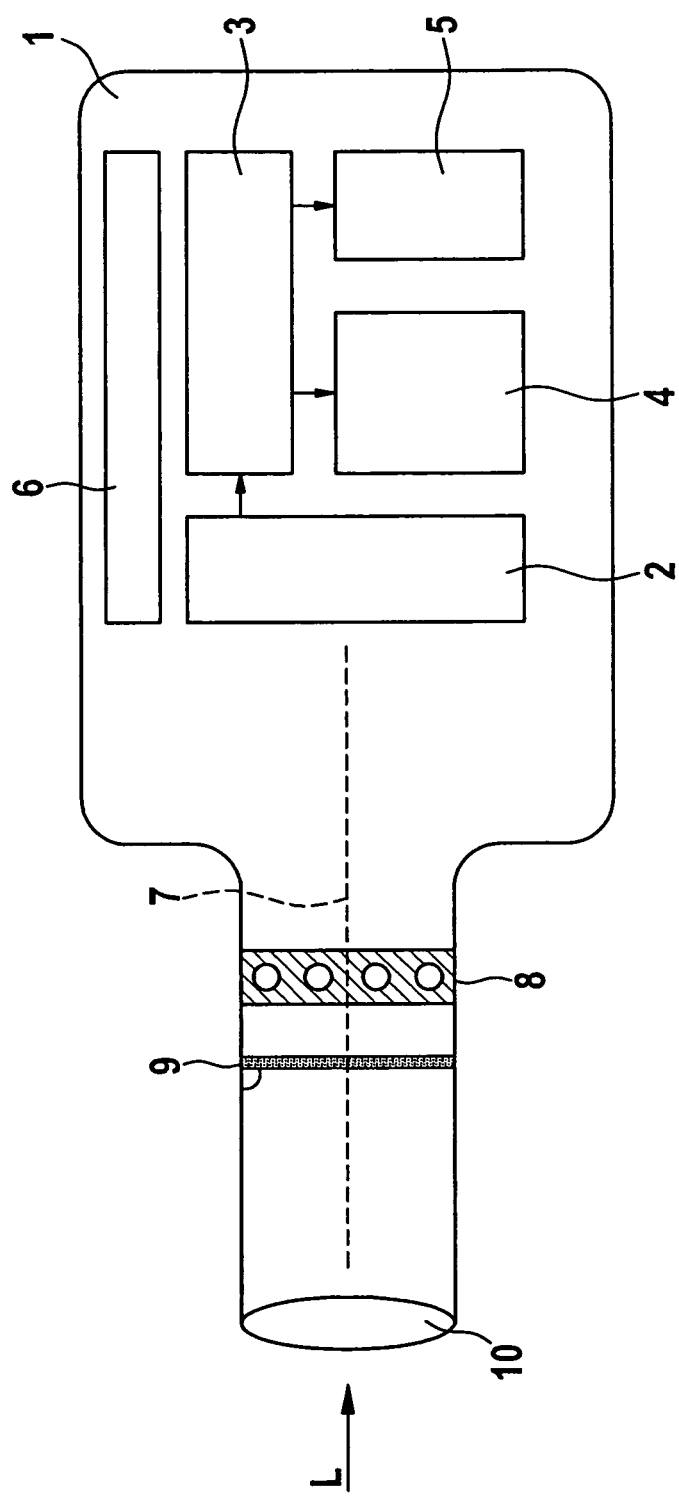
FIG. 1 schematically shows an in-circuit mode in which an example embodiment of the method of the present invention for authenticating a CCD chip within a camera including the CCD chip may be carried out.

The same reference numerals designate identical elements.

FIG. 1 shows a so-called in-circuit mode in which a possible specific embodiment of a device of the present invention for authenticating a CCD chip in a digital CCD camera including the CCD chip is integrated into the corresponding camera, i.e., is an integral component of the camera. FIG. 1 shows a digital camera 1 in which different functional units are implemented. This includes a CCD chip 2, a measuring unit for measuring pixels 3, imaging software 4, and PUF (physical unclonable function) software 5 to be provided for carrying out the method according to the present invention.

Moreover, control software 6 is provided. The optical axis of digital camera 1 is designated by reference numeral 7. A ring of LEDs 8 in front of CCD chip 2 is situated around optical axis 7. The LEDs are displayed as circles. The LEDs as well as the ring of LEDs are designated by reference numeral 8 in the following. The LEDs of this ring 8 are used as illumination sources for illuminating CCD chip 2 during authentication of CCD chip 2 implemented in digital camera 1. Moreover, a movable cover 9, comparable to a shutter of a conventional camera, is provided. This cover 9 is used to prevent light from light sources other than the LEDs from reaching CCD chip 2 during the authentication operation. Another light would falsify the measurement result and unique authentication of CCD chip 2 would no longer be possible. Cover 9 is accordingly situated in relation to CCD chip 2 behind LED ring 8 so that light from an external source, which is only able to come from outside into camera 1, i.e., from the left through opening 10 in camera 1 shown here, as indicated by arrow L, is blocked during the authentication operation. Ring of LEDs 8 situated symmetrically around optical axis 7 ensures uniform illumination of CCD chip 2. As a result of the illumination of CCD chip 2, the pixels on CCD chip 2 are activated and emit specific analog electrical signals, which are recorded by pixel measuring unit 3 and are converted into digital signals. The digital signals are then fed from pixel measuring unit 3 to the corresponding evaluation units. Imaging software 4 is inactive during the authentication operation while PUF software 5 evaluates a corresponding pixel response and establishes whether the resulting response to the illumination by LEDs 8 coincides with the response to be expected so it may be established whether CCD chip 2 illuminated by LEDs 8 is the CCD chip to be implemented in camera 1, i.e., CCD chip 2 may be authenticated according to its pixel response.

PUF software 5 may also be used to generate a key with the help of fuzzy extractor methods as mentioned above instead of using verification or authentication; the key may then be used for external authentication or encoding.

After an authentication operation, the digital camera may then be used for normal purposes in that movable cover 9 is removed or is moved away from opening 10 of the camera so that appropriate light may penetrate from the outside. LEDs 8 are switched off during normal operation and imaging software 4 is activated.

It must be noted that the amount of light from the LEDs must be sufficiently high during authentication for the dominant response or the so-called scene noise of the CCD chip during normal operation to be present as shown in FIG. 1 of the document "An Analysis of CCD Camera Noise and its Effect on Pressure Sensitive Paint Instrumentation System Signal-To-Noise Ratio" by Donald Robert Mendoza. It must also be noted that commercial cameras typically already have a dark cover, for example in the form of the already mentioned shutter, which may likewise be used for the purpose of authentication in a suitable manner.

Figure 2:
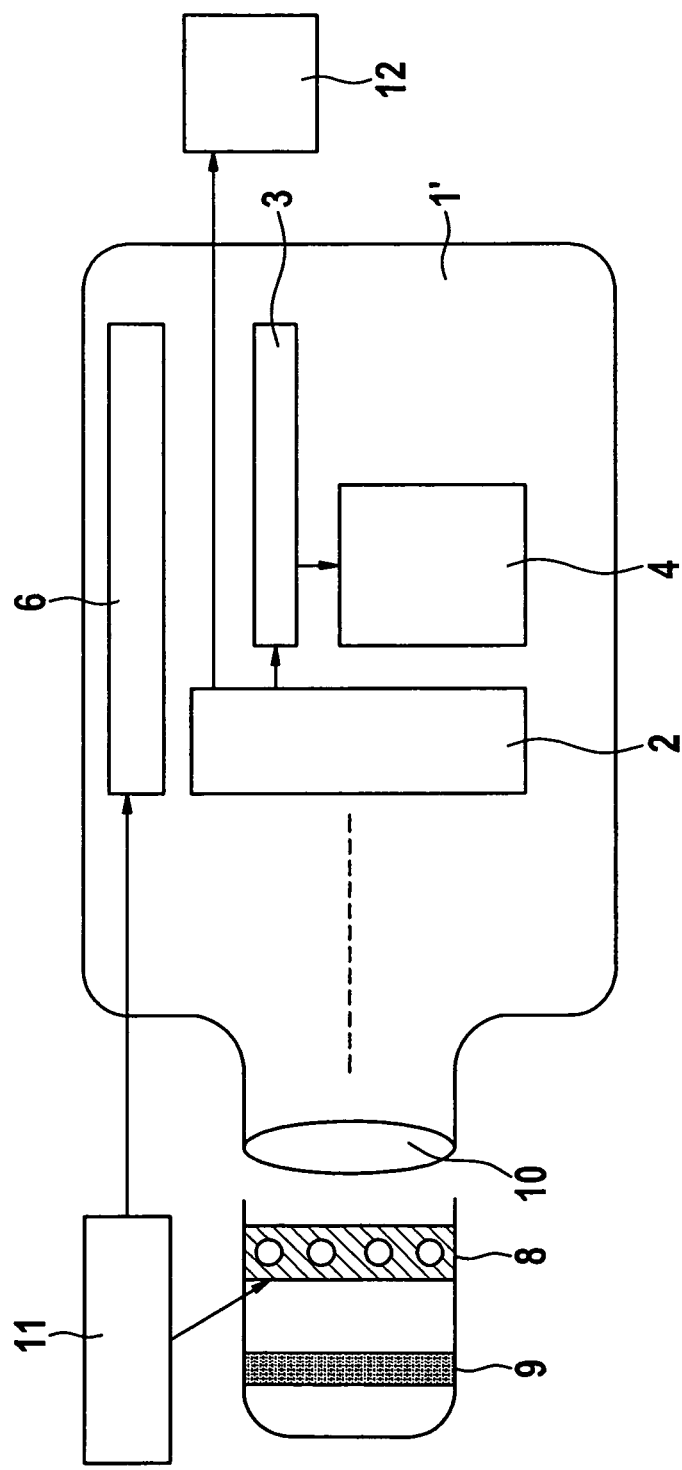
FIG. 2 shows an off-circuit mode in which a further example embodiment of the method of the present invention for authenticating a CCD chip in a camera including the CCD chip may be carried out.

FIG. 2 shows another possible scenario in which implementation of another specific embodiment of the method of the present invention for authenticating a CCD chip in a digital CCD camera is possible. This is a so-called off-circuit mode, whereby the physical unclonable function activates or stimulates the response of the pixels of the CCD chip to a specific stimulation or a specific light incidence via an external device 11 in the case selected here. A corresponding response during stimulation of the CCD pixels may then be investigated, for example, in a database to verify, for example, whether the camera or the CCD chip implemented therein belongs to a specific group or is manufactured by a specific manufacturer. Moreover, this may also be used so that firmware is automatically decoded during a manufacturing procedure and is downloaded to an internal, non-volatile memory of the camera if such a memory is available.

In the off-circuit mode, movable cover 9 as well as ring of LEDs 8 to be situated around optical axis 7 are combined and situated within an external device 11. Device 11 is then to be situated in front of opening 10 of a corresponding camera 1' so that the light of LEDs 8 hits CCD chip 2 according to the light incidence as shown in FIG. 1 in the case of integration of the LEDs in camera 1. In the case of an appropriate configuration of device 11, LEDs 8 in the form of a ring are also situated around optical axis 7 of digital camera 1' and illuminate the surface of CCD chip 2 accordingly. Also in this case, the response of the pixels of CCD chip 2 is measured, evaluated and used as a standard for authenticating CCD chip 2 or corresponding camera 1' implementing the CCD chip. The sequence of method steps to be performed is similar to the in-circuit mode described in connection with FIG. 1. In the off-circuit mode presented here, camera 1' to be authenticated may be smaller and more compact since device 11 for authentication is to be provided externally and the appropriate measuring and evaluation unit may be provided as external member 12. During authentication, external device 11 must thus be positioned in a suitable manner in front of camera 1' so that the appropriate light is able to fall on CCD chip 2 in a suitable manner. Moreover, possibly externally provided measuring and evaluation unit 12 must then also be connected to camera 1' or CCD chip 2 implemented therein and activated accordingly. However, external device 11 including LEDs 8 and movable cover 9 as well as evaluation and measuring unit 12 may be removed after completion of authentication. By providing external devices for evaluating, measuring, and illuminating CCD chip 2 during authentication, it may be ensured that camera 1' to be authenticated is evaluated objectively and units that could output a falsified image or value are not present inside camera 1'. With the aid of this method and digital signatures, it may be established whether a certain camera was actually manufactured by a specific manufacturer.

In summary it may be established that the method according to the present invention and the device and camera according to the present invention are suitable for using pixel noise (scene noise) of CCDs as a physical unclonable function to authenticate a corresponding CCD chip or a corresponding camera implementing this CCD chip. According to a specific application, either the in-circuit mode or the off-circuit mode may be selected. The method according to the present invention provides an efficient way of unambiguously identifying cameras for different applications such as for verifying the source of media or for encoding or decoding parts of camera firmware for corresponding know-how protection.

What is claimed is:

1. A method for encoding software in a digital camera, comprising:
    using a physical unclonable function to generate a cryptographic key, wherein the physical unclonable function is a measured response of pixels in the charge-coupled device to a defined incident light illuminating the charge-coupled device; and encoding the software based on the cryptographic key.

2. The method as recited in claim 1, wherein the defined incident light illuminating the charge-coupled device is a light of a defined wavelength.

3. The method as recited in claim 2, wherein at least one LED is used as a light source for the defined incident light.

4. The method as recited in claim 3, wherein multiple LEDs are positioned in a ring-shaped pattern around the optical axis of the camera such that the entire surface of the charge-coupled device is illuminated.

5. The method as recited in claim 3, wherein undesirable light incidence on the charge-coupled device is prevented by using a movable opaque cover.

6. The method as recited in claim 3, wherein the light incident on the charge-coupled device is provided by a light source integrated into the camera.

7. A device for encoding software in a digital camera, comprising:
    a light source for defined illumination of the charge-coupled device;
    a movable opaque cover positioned to prevent undesirable light incidence on the charge-coupled device; and
    a measuring and evaluation unit;
        wherein the light source illuminates the charge-coupled device using a defined light incidence, and a response of pixels present in the charge-coupled device to the defined light incidence is measured and evaluated by the measuring and evaluation unit as a physical unclonable function, and the physical unclonable function is used to generate a cryptographic key that serves as a basis for encoding the software.

* * * * *